United States Patent [19]

Hoehn, Jr.

[11] Patent Number: 4,578,645
[45] Date of Patent: Mar. 25, 1986

[54] BOREHOLE LOGGING TOOL UTILIZING ELECTROMAGNETIC ENERGY IN THE DETERMINATION OF DIP OF SUBSURFACE FORMATIONS SURROUNDING A BOREHOLE

[75] Inventor: Gustave L. Hoehn, Jr., Dallas, Tex.

[73] Assignee: Mobil Oil Corporation, New York, N.Y.

[21] Appl. No.: 576,084

[22] Filed: Feb. 1, 1984

[51] Int. Cl.⁴ .............................................. G01V 3/30
[52] U.S. Cl. .................................................... 324/338
[58] Field of Search .................... 324/333, 338, 339; 367/25, 30, 35; 250/268

[56] References Cited

U.S. PATENT DOCUMENTS

| | | | |
|---|---|---|---|
| 3,388,323 | 6/1968 | Stripling | 324/8 |
| 3,849,721 | 11/1974 | Calvert | 324/6 |
| 3,944,910 | 3/1976 | Rau | 324/6 |
| 4,092,583 | 5/1978 | Coates | 324/338 |
| 4,107,597 | 8/1978 | Meador et al. | 324/6 |
| 4,383,220 | 5/1983 | Baldwin | 324/338 |
| 4,511,842 | 4/1985 | Moran et al. | 324/338 |

OTHER PUBLICATIONS

"Electromagnetic Propagation . . . A New Dimension in Logging", Society of Petroleum Engineers of AIME, Paper No. SPE 6542, by T. J. Calvert and R. N. Rau, 1977.

Primary Examiner—Gerard R. Strecker
Attorney, Agent, or Firm—A. J. McKillop; Michael G. Gilman; George W. Hager, Jr.

[57] ABSTRACT

An electromagnetic borehole logging tool has at least two antenna arrays positioned at spaced-apart locations along the longitudinal axis of the borehole tool. Each antenna array has at least three sub arrays spaced approximately equally around the longitudinal axis of the tool. Each sub array has at least one antenna for transmitting and receiving electromagnetic energy. The three sub arrays of the first of the two antenna arrays are respectively located at approximately the same circumferential positions around the longitudinal axis of the tool as the three sub arrays of the second of the two antenna arrays. Each of the sub arrays transmits electromagnetic energy into the formations surrounding the borehole and receives electromagnetic energy upon its return to the borehole from such formations.

3 Claims, 4 Drawing Figures

BOREHOLE LOGGING TOOL UTILIZING ELECTROMAGNETIC ENERGY IN THE DETERMINATION OF DIP OF SUBSURFACE FORMATIONS SURROUNDING A BOREHOLE

BACKGROUND OF THE INVENTION

This invention relates to a system and method for determining the dip of subsurface formations penetrated by a borehole. More particularly, this invention is directed to an apparatus and method that uses electromagnetic energy to determine a dip of subsurface formations penetrated by a borehole.

A discussion of the determination of dip of subsurface formations and of dipmeters is found in FORMATION EVALUATION by Edward J. Lynch, Harper & Row, Publishers, New York, Evanston and London, beginning at page 341. It is there pointed out that the problem of the determination of formation dip evolves into one of locating three points within a depositional layer with reference to a horizontal plane such that a plane is defined by the three points and the angle of dip is that angle between this plane and the horizontal plane. Instruments have been used which can record three electric logs properly spaced and oriented in a single borehole to determine the dip of the subsurface formations penetrated by the borehole. These instruments require an accurate directional survey of the borehole. Wireline dipmeters which are commonly used for this purpose must take three basic measurements. The first is the measurement of dip of the formation relative to the borehole. This has been done by including identical sets of electrodes spaced at 120° and all on the same plane perpendicular to the axis of the tool. The second is a measurement of the direction and angle of inclination of the borehole, and the third is a measurement of the orientation of the tool relative to magnetic north.

Early dipmeters used three SP curves to get the dip relative to the hole axis and used a photoclinometer to determine the hole inclination and direction. A continuous type of dipmeter later introduced employs three microlog devices to make the three required electrical logs. The microdevices are always pressed against the wall of the borehole, thus causing the spacing between them to change as the size of the borehole changes. This necessitates the recording of the borehole size.

In U.S. Pat. No. 3,388,323 to Allen A. Stripling, there is described a technique which has become known as "induction logging" for determining dip of subsurface formations. Two independent parameters indicative of magnetic susceptibility and electrical conductivity or resistivity are derived from magnetic field measurements carried out at three angular positions adjacent a borehole wall. Three coils are employed for carrying out the borehole measurements. These coils are energized to generate magnetic fields at three angular regions around the borehole wall, and the outputs thereof are phase separated into magnetic susceptibility and resistivity measurements. A 10,000-cycle-per-second oscillator and a 1,000-cycle-per-second oscillator are employed for energizing the coils. These high and low frequency oscillators are employed to increase the sensitivity of the coil to changes in electrical conductivity and magnetic susceptibility.

In a paper entitled "ELECTROMAGNETIC PROPAGATION . . . A New Dimension in Logging" by Thomas J. Calvert, Rama N. Rau, and Larry E. Wells, prepared for presentation at the 1977 47th Annual California Regional Meeting of the Society of Petroleum Engineers of AIME in Bakersfield, Calif. Apr. 13–15, 1977, there is described the operating principles of a well logging tool that measures the phase shift and attenuation of microwave-frequency energy propagated through the formations near a borehole. Also described is an interpretation method for deriving from these measurements the values of porosity and water saturation of earth formations. It is pointed out that this tool is most accurate in fresh water. It is further pointed out at page 15 that the tool is designed for fresh-mud applications and that signal levels may be too low in salt muds and signals are not reliable in oil or gas filled boreholes.

Logging techniques using electromagnetic energy are described in U.S. Pat. No. 3,849,721 to Thomas J. Calvert; U.S. Pat. No. 3,944,910 to Rama N. Rau; U.S. Pat. No. 4,107,597 to Meador et al; and U.S. Pat. No. 4,383,220 to Baldwin.

SUMMARY OF THE INVENTION

The present invention is directed to an electromagnetic logging tool for use in the determination of the dip of subsurface earth formations surrounding a borehole. A borehole tool has at least two antenna arrays positioned at spaced-apart locations along the longitudinal axis of the borehole tool. Each antenna array has at least three sub arrays spaced approximately equally around the longitudinal axis of the tool. Each sub array has at least one antenna for transmitting and receiving electromagnetic energy. The three sub arrays of the first of the two antenna arrays are respectively located at approximately the same circumferential positions around the longitudinal axis of the tool as the three sub arrays of the second of the two antenna arrays. Each of the at least one antenna transmits electromagnetic energy into the formations surrounding the borehole and receives electromagnetic energy upon its return to the borehole from such formations.

The amplitude differences between the electromagnetic signals received by the at least one antenna in each sub array are determined. The phases between the corresponding amplitude differences of the two spaced-apart antenna arrays are determined. These phases are utilized in the determination of dip of the subsurface formations surrounding the borehole.

DESCRIPTION OF THE PREFERRED EMBODIMENTS

This invention is directed to a system and method for determining the dip of subsurface earth formations penetrated by a borehole. The system is comprised of a borehole dipmeter which utilizes electromagnetic energy for determining the dip of subsurface earth formations that are penetrated by a borehole.

An elongnated borehole tool is provided that is adapted for movement through the borehole. A multiconductor logging cable containing electrical conductors for transmitting electrical signals intermediate the surface of the earth and the borehole tool connects with the borehole tool and provides for lowering and raising the tool in the borehole. In operation, the logging cable extends to a means such as a reel for lowering and raising the tool in the borehole. The borehole tool includes at least two antenna arrays spaced-apart along the longitudinal axis of the tool. Each antenna array includes at least three sub-antenna arrays equally spaced around the axis, approximately 120° one from the other. More than three antenna arrays may be included but three are normally sufficient. Therefore for simplicity of description, this tool will hereafter be described as having three antenna arrays. Each of the antenna sub arrays has at least one antenna for transmitting and receiving electromagnetic energy. The tool is adapted for supporting and positioning each of the antenna sub arrays against the wall of the borehole. A means is provided for simultaneously supplying electromagnetic energy of a frequency within the range of 1.0 to 3.0 gigahertz (GHz) to each of the sub arrays for transmitting electromagnetic energy into the earth formations. Each sub array has coupled thereto means for detecting electromagnetic energy returning to the borehole from the earth formations. The means for detecting the returning electromagnetic energy may be a means for determining the amplitude of the received signal, or a means for determining the phase of the received signal as compared to the transmitted signal. Further, the borehole tool may be adapted with both a means for determining the amplitude of the received signal and a means for determining the phase of the received signal. The electromagnetic energy may be pulsed or transmitted continuously from each antenna sub array comprising at least one antenna. For a pulsed transmission system, only one antenna is necessary for each antenna sub array which can be switched between transmit and receive modes of operation. For a continuous transmission system, separate transmitting and receiving antennas are required for each antenna sub array. Such a continuous transmission system may be preferred to obtain a continuous indication of formation changes.

Figure 1:
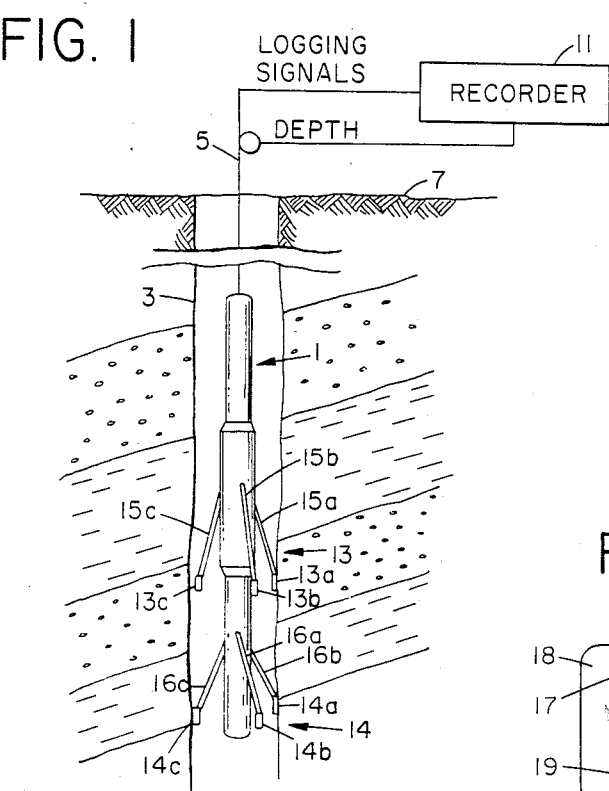
FIG. 1 is a schematic drawing illustrating the system for determining dip of subsurface formations located in a borehole.

The invention is now described in more detail by reference to the drawings. In FIG. 1 there is schematically shown an electromagnetic dipmeter 1 supported in a borehole 3 by a multiconductor logging cable 5 which extends from the electromagnetic borehole dipmeter 1 to the surface 7 of the earth. The multiconductor cable 5 is illustrated connecting with a recorder 11 for recording signals received by the electromagnetic dipmeter 1. The electromagnetic dipmeter 1 includes a first antenna array 13 having three sub antenna arrays 13a–13c spaced approximately equally around the longitudinal axis of the dipmeter 1. These sub arrays 13a–13c are aligned along a horizontal plane which passes perpendicularly through the longitudinal axis of the dipmeter 1. The sub arrays 13a–13c are adapted for being supported by the dipmeter 1 and positioned against the wall of the borehole 3 by the support means 15a–15c.

The electromagnetic dipmeter 1 further includes a second antenna array 14 having the sub antenna arrays 14a–14c spaced approximately equally around the longitudinal axis of the dipmeter 1. The sub arrays 14a–14c, in similar manner to sub arrays 13a–13c, are aligned along a horizontal plane which passes perpendicularly through the longitudinal axis of the dipmeter 1, and are positioned against the wall of the borehole 3 by the support means 16a–16c. Sub array 14a is located below sub array 13a and at the same angular position around the longitudinal axis of the dipmeter 1 as is sub array 13a. Likewise, sub arrays 14b and 14c are located below sub arrays 13b and 13c respectively and at the same angular positions around the longitudinal axis of the dipmeter 1 as are sub arrays 13b and 13c respectively.

It can therefore be understood that the three antenna sub arrays 13a–13c of antenna array 13 define a first horizontal plane about the longitudinal axis of the dipmeter 1 while the three antenna sub arrays 14a–14c of antenna array 14 define a second spaced-apart horizontal plane about the longitudinal axis of the dipmeter 1.

Figure 2A:
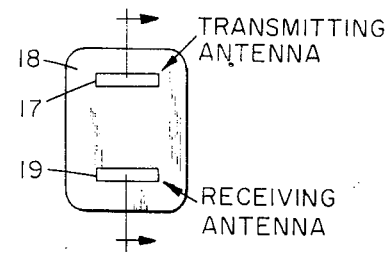
FIGS. 2A. and 2B are schematic views of a pad housing both a transmitting and a receiving antenna.
Figure 2B:
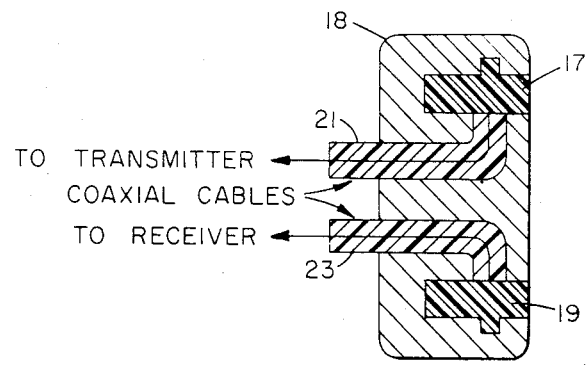

With reference now to FIGS. 2A and 2B, there are shown front views and cross-sectional views of a pad 18 containing an antenna sub array such as sub array 13a, for example, comprised of one transmitting antenna and one receiving antenna for use in the preferred continuous transmission mode of operation. It is desirable that the pad 18 be of a relatively small size. This lessens the variance which might otherwise be caused by hole rugosity. It also increases the vertical resolution. In general terms, the overall dimensions of the pad 18 may be in the range of about three inches in width by five inches in length by one and one-half inches in thickness. The transmitting antenna 17 and the receiving antenna 19 desirably have a horizontal width of about one-half the wavelength of the electromagnetic energy to be used. The transmitting antenna 17 and the receiving antenna 19 desirably are located longitudinally one from the other about two to three inches. In FIG. 2B there is shown a cross-sectional view of the pad 18 along the line A—A of FIG. 2A. A coaxial cable 21 is shown extending from a transmitter (not shown) to the transmitting antenna 17. The slot making up the transmitting antenna 17 would extend from the face of the antenna into the material of the pad 13 for a distance of about one-fourth of the electromagnetic wavelength to be used. Another coaxial cable 23 is shown extending from a means for detecting the received signal, a detector (not shown), to the receiving antenna 19. Instead of utilizing separated pads for each of the transmitting and receiving antenna pairs, a single supporting structure for all such antenna pairs may be employed. Further, vertical orientation of the transmitting and receiving pairs in each horizontal plane may be reversed. For example the transmitting antennas of the upper pairs 13a–13c may be located above the receiving antennas, while the transmitting antennas of the lower pairs 14a–14c may be located below the receiving antennas. Similarly the upper pairs 13a–13c may have their receiving antennas located above their transmitting antennas while the lower pairs 14a–14c may have their receiving antennas located below their transmitting antennas.

Figure 3:
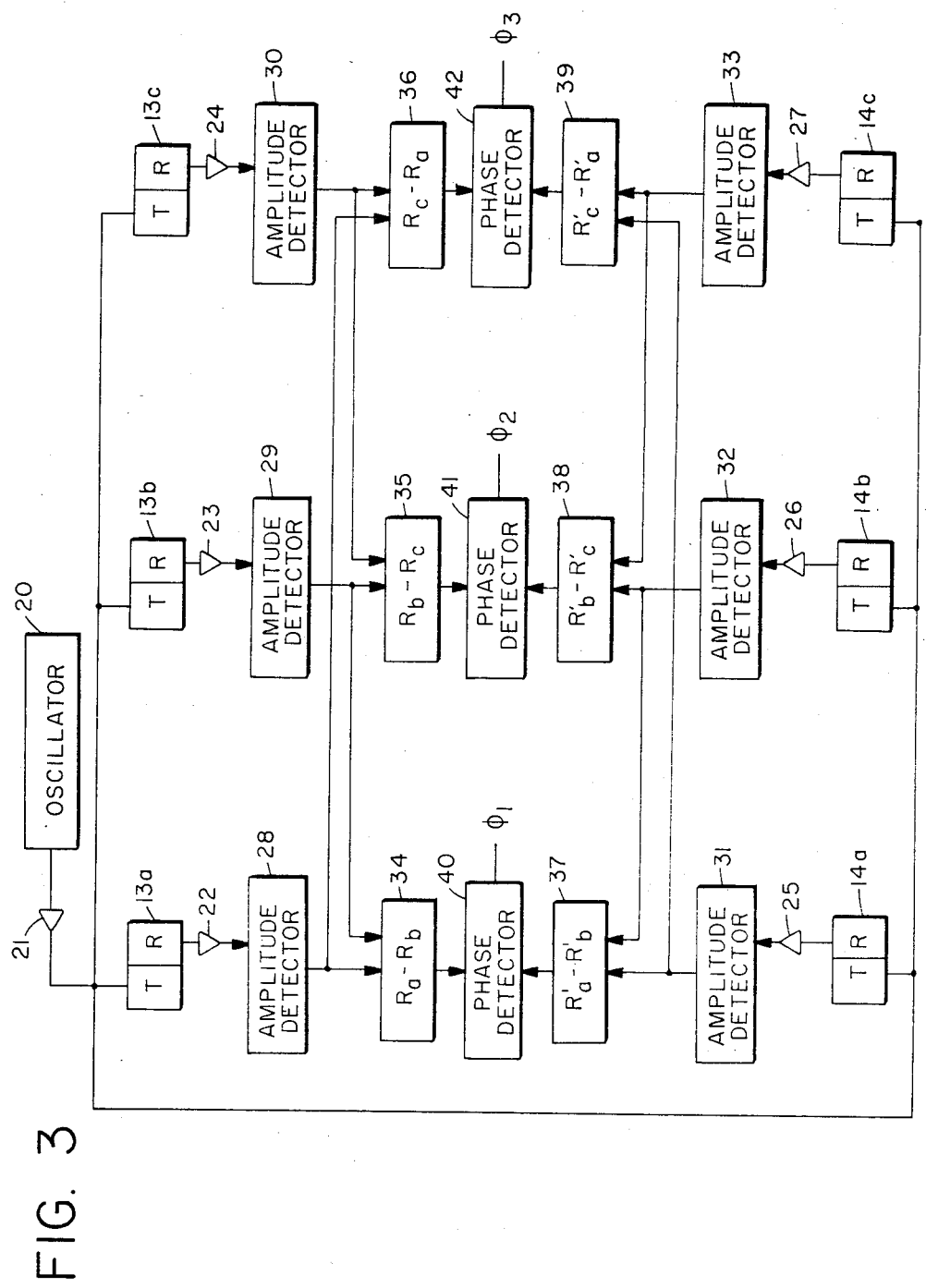
FIG. 3 is an electronic block diagram illustrating the circuitry for transmitting and receiving electromagnetic energy by the system of FIG. 1.

With reference now to FIG. 3, there is shown an electronic block diagram of the electromagnetic dimpeter. An oscillator 20 for generating selected electromagnetic frequencies within the frequency range of 1 to 3 GHz is used in this electromagnetic dipmeter. Such oscillators have been used in downhole equipment as is illustrated in U.S. Pat. No. 3,944,910 and U.S. Pat. No. 4,092,583, which patents are concerned with investigating earth formations surrounding a borehole and with determining the water-filled porosity of formations surrounding a borehole. One oscillator 20 is sufficient for the present dipmeter.

In operation, the oscillator 20 generates electromagnetic energy within a selected frequency range of 1 to 3 GHz and desirably of a frequency of about 2 GHz and this electromagnetic energy is transmitted to a tuned power amplifier 21 and thence through coaxial lines to the transmitting antennas of sub arrays 13a-13c and 14a-14c. The electromagnetic energy is continuously transmitted via the transmitting antennas of such sub arrays into the subsurface earth formations penetrated by the borehole. Electromagnetic energy is continuously received by the receiving antennas of sub arrays 13a-13c and 14a-14c. The received electromagnetic energy is transmitted via the coaxial lines to the tuned amplifiers 22-27. The signals from the tuned amplifiers 22-27 may then be passed to the detectors 28-33 for producing a signal proportional to the amplitude received by the respective receiving antennas. These signals, proportional to the received signal amplitudes, are sent to difference detectors 34-39 which determine the differences between the three receiving antennas of each of the arrays 13 and 14. For example, the amplitude of the signals received by receiving antennas of sub arrays 13a and 13b of array 13 are selectively subtracted by the difference detectors 34-36 to produce the three difference signals $R_a-R_b$, $R_b-R_c$ and $R_c-R_a$ respectively. In like manner the amplitudes of the signals received by receiving antennas of sub arrays 14a-14c of array 14 are selectively subtracted by the difference detectors 37-39 to produce the three difference signals $R_a'-R_b'$, $R_b'-R_c'$ and $R_c'-R_a'$ respectively.

The difference signals $R_a-R_b$ and $R_a'-R_b'$ from difference detectors 34 and 37 respectively are applied to phase detector 40. Difference signals $R_b-R_c$ and $R_b'-R_c'$ from difference detectors 35 and 38 respectively are applied to phase detector 41. Difference signals $R_c-R_a$ and $R_c'-R_a'$ from difference detectors 36 and 39 respectively are applied to phase detector 42. The phase signals $\phi_1$, $\phi_2$ and $\phi_3$ from phase detectors 40, 41 and 42 respectively are sent up the logging cable to the surface of the earth for recording in correlation with depth as the dipmeter 1 is moved through the borehole.

At the surface, the three phase signals $\phi_1$, $\phi_2$ and $\phi_3$ may be compared one to the other in a manner similar to that used by conventional dipmeters to determine the dip of the subsurface formations penetrated by the borehole, such as that described in the aforementioned reference in FORMATION EVALUATION by Edward J. Lynch. Although not shown, it will be understood that the dipmeter 1 includes means for measuring and trasmitting to the surface of the earth the direction and angle of inclination of the borehole for measuring the orientation of the dipmeter relative to magnetic north, and the size of the borehole.

It is a specific aspect of the present invention to use the difference signals $\phi_1$, $\phi_2$ and $\phi_3$ to balance out amplitude effects of high energy electromagnetic surface waves that travel directly between the transmitter and receiver. Such signals, if not taken into account, will obscure those lower energy electromagnetic signals that travel through the formation media between the transmitter and receiver and which contain information reflecting any resistivity contrast of the media due to formation dip.

These high energy surface waves travel directly through the borehole fluid (i.e. mud) and through any mud cake built up along the borehole wall. By subtracting the reciever signals in the first antenna array 13 for example 13a and 13b, these surface waves are cancelled and the residual signal Ra-Rb, representing the difference in travel time to receivers 13a and 13b, is driven to zero so long as both the media and borehole mud or mud cake are uniform. Likewise, the difference $R_a'-R_b'$ in the signals from the corresponding receivers 14a and 14b in the second antenna array 14 are driven to zero so long as the media and borehole mud and mud cake are uniform.

In this case, there will be a constant phase between the $R_a-R_b$ and $R_a'-R_b'$ signals. However, when either antenna arrays 13 or 14 pass a dipping formation interface, the change in media resistivity will cause one of the difference signals $R_a-R_b$ or $R_a'-R_b'$ to deviate from zero. This deviation is reflected in a phase change between the two difference signals. Consequently amplitude changes due to media resistivity changes will not be masked by the larger amplitude electromagnetic surface waves traveling through the borehole mud or mud cake. In this manner, electromagnetic propagation through the formations surrounding a borehole can be used as an effective means for formation dip determination.

I claim:

1. An electromagnetic logging tool for use in the determination of the dip of subsurface earth formations surrounding a borehole, comprising:
   a. a borehole tool adapted for movement through said borehole and having at least two antenna arrays positioned at spaced-apart locations along the longitudinal axis of said tool, each of said antenna arrays having at least three antenna sub arrays spaced approximately equally around the longitudinal axis of said tool for transmitting and receiving electromagnetic energy, the three sub arrays of a first of said two antenna arrays being respectively located at approximately the same circumferential positions around the longitudinal axis of said tool as the three sub arrays of the second of said two antenna arrays;
   b. means for simultaneously supplying electromagnetic energy to each of said sub arrays of said two antenna arrays for transmitting electromagnetic energy into said earth formations;
   c. means coupled to said each of said sub arrays of said two antenna arrays for detecting the amplitudes of the electromagnetic signals returning to each said sub array from said earth formations;
   d. means for determining the amplitude differences between the electromagnetic signals received by each of said sub arrays in each of said two antenna arrays to provide at least three amplitude differences for each antenna array; and
   e. means for determining the phase of each of the amplitude differences of said first antenna array with respect to the corresponding amplitude difference of said second antenna array.

2. An electromagnetic logging tool for logging subsurface earth formations surrounding a borehole, comprising:
   a. a borehole tool adapted for movement through said borehole and having first and second antenna arrays positioned at spaced-apart positions along the longitudinal axis of said tool; said first antenna array having first, second, and third antenna sub arrays spaced approximately equally around the longitudinal axis of said tool and said second antenna array having fourth, fifth and sixth antenna sub arrays spaced respectively at approximately the same circumferential positions around the longitudinal axis of said tool as said first, second and third antenna sub arrays; and each of said sub arrays transmitting and receiving electromagnetic energy;

b. means for simultaneously applying electromagnetic energy to each of said sub arrays for transmitting electromagnetic energy into said subsurface earth formations;

c. means coupled to each of said sub arrays for detecting the amplitudes of the electromagnetic signals returning to the borehole from said subsurface earth formations;

d. means for producing first, second and third difference signals representing the differences in the amplitudes of the electromagnetic signals received by said first and second sub arrays, by said second and third sub arrays, and by said third and first sub arrays respectively;

e. means for producing fourth, fifth and sixth difference signals representing the differences in the amplitudes of the electromagnetic signals received by said fourth and fifth sub arrays, by said fifth and sixth sub arrays and by said sixth and fourth sub arrays respectively; and f. means for producing first, second and third phase signals representing the phase differences between said first and fourth difference signals, between said second and fifth difference signals and between said third and sixth difference signals respectively, said phase signals being constant when the subsurface earth formation surrounding said tool is of a uniform medium and selectively deviating from said constant when said tool passes by a resistivity contrast in the medium of said subsurface earth formation.

3. A borehole logging tool comprising:

a. a borehole tool adapted for movement though said borehole;

b. a first antenna array having first, second and third antenna sub arrays positioned in a first horizontal plane within the borehole and spaced approximately equally about the longitudinal axis of said tool, each of said first, second and third sub arrays transmitting and receiving electromagnetic energy;

c. a second antenna array having fourth, fifth and sixth antenna sub arrays positioned in a second horizontal plane within the boreole at a spaced-apart position along the longitudinal axis of said tool from said first antenna array and spaced approximately equally about the longitudinal axis of said tool at the same circumferential positions as the said first, second and third sub arrays respectively of said first antenna array, each of said fourth, fifth and sixth sub arrays transmitting and receiving electromagnetic energy;

d. means for simultaneously applying electromagnetic energy to each of said first and second antenna arrays such that electromagnetic energy is transmitted into the earth formations surrounding the borehole;

e. means coupled to each of said first and second antenna arrays for detecting the amplitudes of the electromagnetic signals having traveled through the earth formations surrounding the borehole;

f. means for determining a first differential in the amplitudes of the electromagnetic signals received by said first and second sub arrays of said first antenna array and for determining a second differential in the amplitudes of the electromagnetic signals received by said fourth and fifth sub arrays of said second antenna array;

g. means for determining the phase between said first and second differentials, a change in said phase in direction from a constant level indicates a change in the resistivity of the formation due to a dipping subsurface formation passing through said first horizontal plane and between said first and second sub arrays and a change in said phase in the opposite direction from a constant level indicates a change in the resistivity of the formation due to a dipping subsurface formation passing through said second horizontal plane and between said fourth and fifth sub arrays;

h. means for determining a third differential in the amplitudes of the electromagnetic signals received by said second and third sub arrays of said first antenna array and for determining a fourth differential in the amplitudes of the electromagnetic signals received by said fifth and sixth sub arrays of said second antenna array;

i. means for determining the phase between said third and fourth differentials, a change in said phase in one direction from a constant level indicates a change in the resistivity of the formation due to a dipping subsurface formation passing through said first horizontal plane and between said second and third sub arrays and a change in said phase in the opposite direction from a constant level indicates a change in the resistivity of the formation due to a dipping subsurface formation passing through said second horizontal plane and between said fifth and six sub arrays;

j. means for determing a fifth differential in the amplitudes of the electromagnetic signals received by said first and third sub arrays of said first antenna array and for determining a sixth differential in the amplitudes of the electromagnetic signals received by said fourth and sixth sub arrays of said second antenna array; and k. means for determining the phase between said fifth and sixth differential, a change in said phase in one direction from a constant level indicates a change in the resistivity of the formation due to a dipping subsurface formation passing through said first horizontal plane and between said first and third sub arrays and a change in said phase in the opposite direction from a constant level indicates a change in the resistivity of the formation due to a dipping subsurface formation passing through said second horizontal plane and between said fourth and sixth sub arrays.

* * * * *